(12) United States Patent
Kuris et al.

(10) Patent No.: US 7,779,193 B2
(45) Date of Patent: Aug. 17, 2010

(54) METHOD AND APPARATUS FOR EXTERNAL DATA TRANSFER IN A PERSONAL STORAGE DEVICE

(75) Inventors: Benjamin Kuris, Cambridge, MA (US);
Steven M. Ayer, Marblehead, MA (US);
Roy Want, Los Altos, CA (US); Trevor Pering, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 11/960,548

(22) Filed: Dec. 19, 2007

(65) Prior Publication Data

US 2009/0037634 A1 Feb. 5, 2009

Related U.S. Application Data

(60) Provisional application No. 60/999,751, filed on Aug. 3, 2007.

(51) Int. Cl.
*G06F 13/00* (2006.01)

(52) U.S. Cl. .................... 710/303; 710/304; 710/305

(58) Field of Classification Search ......... 710/301–306, 710/316–317; 361/686
See application file for complete search history.

(56) References Cited

U.S. PATENT DOCUMENTS 6,035,354 A * 3/2000 Klein ..................... 710/303
2005/0152111 A1* 7/2005 Skurdal et al. ........... 361/686

OTHER PUBLICATIONS

Scouras, Ismini. "Cypress Unveils Peripheral Controller for Multimedia Handsets." eeProductCenter. http://www.eeproductcenter.com/article/printableArticle.jhtml?printable=true &articleID=196513572&printable=true. Nov. 28, 2006. 2 pages.
SD Association; "Secure Digital Input/Output (SDIO) Card Specification" SD Card Specification Simplified Version of: Part E1, Version 1.00, Oct. 2001. pp. 29.

* cited by examiner

*Primary Examiner*—Mark Rinehart
*Assistant Examiner*—Kim T Huynh
(74) *Attorney, Agent, or Firm*—Caroline M. Fleming

(57) ABSTRACT

A micro-watt class sensing device uses host-computer Input/Output (I/O) capabilities when transferring data to/from the host-computer directly from/to memory in the sensing device. This capability allows data to be directly transferred (downloaded/uploaded) to/from the host system at a higher rate when a host system is present.

16 Claims, 3 Drawing Sheets

METHOD AND APPARATUS FOR EXTERNAL DATA TRANSFER IN A PERSONAL STORAGE DEVICE

RELATED APPLICATIONS

This application claims the benefit of U.S. Provisional Application No. 60/999,751, filed on Aug. 3, 2007. The entire teachings of the above application are incorporated herein by reference.

FIELD

This disclosure relates to personal storage devices and in particular to personal storage devices that store data for personal sensing applications such as behavioral or physiological monitoring applications.

BACKGROUND

As the cost of heath care continues to increase coupled with an aging population, sensing devices are being developed to support health monitoring in environments other than a medical environment, for example, a hospital or doctor's office. These devices can reduce cost of heath care, improve the quality of life for patients and allow monitoring progression of diseases.

A key capability of these devices is the ability to sense that can take the form of direct measurement of biometric parameters, for example, Electrocardiograph (ECG), pulse rate, skin temperature and blood pressure.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
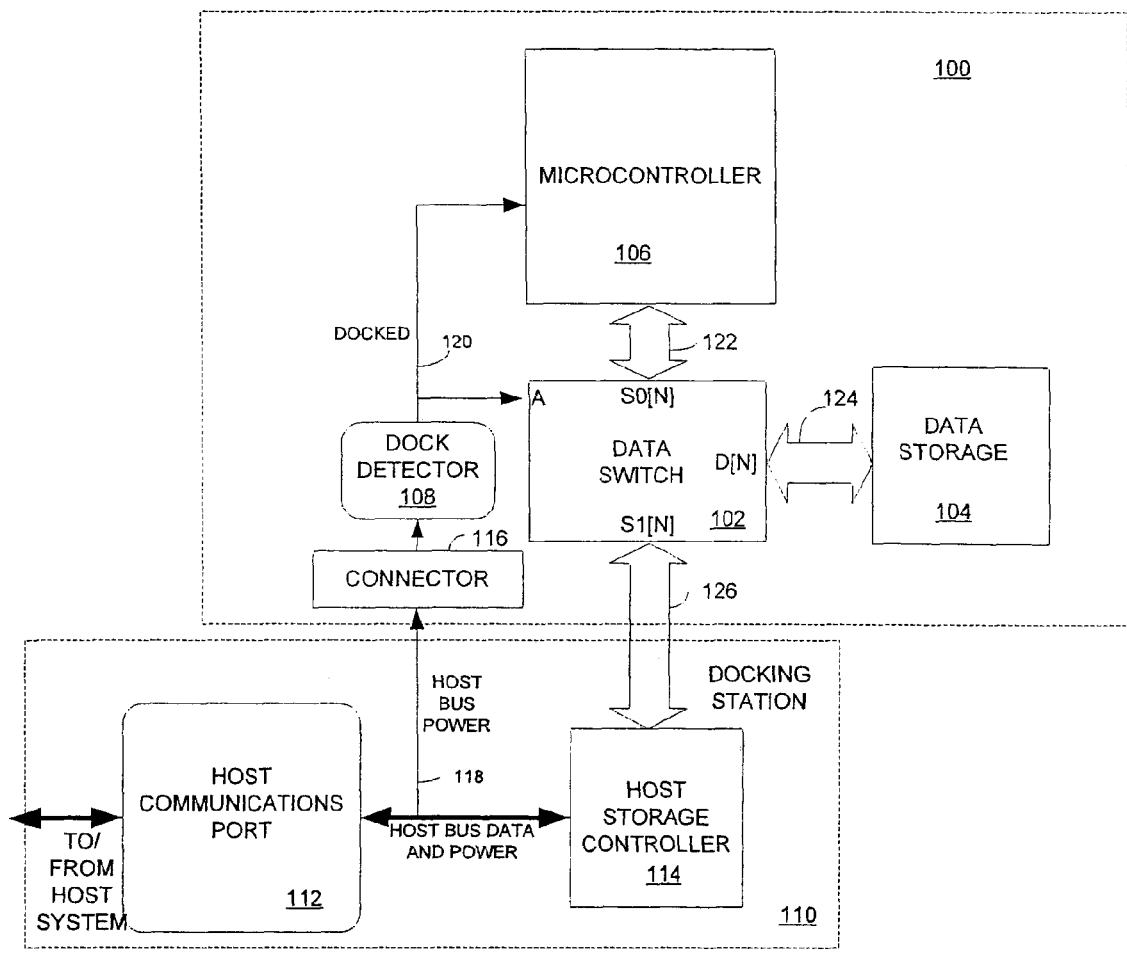
FIG. 1 is a block diagram of an embodiment of a low power small form factor portable device including a data switch to allow a host system to control transfer of data stored in data storage in the device according to the principles of the present invention.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A sensing device for sensing biometric parameters needs to be small, have low-power consumption and provide data integrity. A low power device typically includes a processor that operates at a low frequency, for example, less than 20 Mega Hertz (MHz). Typically, access to data stored in memory in the sensing device, for example, flash memory is provided by a processor in the sensing device over a network communication interface.

In order to download stored data to a host system, for example, an external personal computer (PC) connected over a Universal Serial Bus (USB), data is forwarded through the processor in the sensing (sensor) device and is throttled by the modest capabilities of the processor. The low processor (Central processor Unit (CPU)) clock frequency is sufficient for downloading data at data transfer rates of less than 1 Mega bits per second (Mbps).

The transfer of sensing data using this slow 1 Mbps channel to a conventional host computing device takes a long time and may preempt other device tasks in the sensing device. For example, it takes about 13 minutes to download 100 MB of data over a 1 Mbps connection. Data transfer rates of less than 1 Mbps are sufficient for wired or wireless communication of status, alerts, or decimated sensing data but are problematic for forwarding data acquired by continuous sensing where data sets may exceed 100 Mega Bytes (MB).

Typically host systems support high-speed Input/Output (I/O) at speeds up to 133 Mega Bytes per second (MBps) on standard interfaces such as USB or Institute of Electrical and Electronics Engineers (IEEE) 1394. Theoretically, this constitutes a transfer time reduction of greater than 1000 times; for example, downloading 100 MB takes less than one second over a 133 MBps interface.

In an embodiment of the present invention, a micro-watt class minimally capable sensing device includes a dual-mode system interconnection. The sensing device operates in a first mode while coupled to a docking station and in a second mode while not coupled to the docking station. The dual-mode system interconnection provides the means to operate in each of the two modes. An embodiment of the dual-mode system interconnection will be described later in conjunction with FIG. 3.

The sensing device uses host-computer Input/Output (I/O) capabilities when transferring data to/from a host-computer directly from/to memory in the sensing device. Through the use of host-computer I/O capabilities, there is no system/training requirement for users of the sensing device, reduced development complexity, device data transfer interoperability, and improved device data transfer reliability, improved convenience from higher data transfer speeds. Furthermore, data recovery is allowed from sensing devices with exhausted batteries, for example, a disposable sensing device with no means for battery replacement.

FIG. 1 is a block diagram of an embodiment of a low power small form factor portable device 100 including a data switch 102 to allow a host system to control external transfer of data stored in data storage 104 in the device 100 according to the principles of the present invention. The portable device 100 may perform continuous monitoring by sensing biometric parameters, for example, Electrocardiograph (ECG), pulse rate, skin temperature and blood pressure and storing the sensed data in data storage in the portable device 100. In an embodiment of the invention, the data switch 102 allows a host system to transfer data externally to/from the device 100 when the low power small form factor portable device 100 is coupled to a docking station 110 or a computing device integrating components of a docking station.

The portable device 100 includes a microcontroller 106, a data switch 102 and a dock detector 108. In an embodiment, the microcontroller 106 may be a low-power MSP430 microprocessor (processor) available from Texas Instruments™, or any other processor that has extremely low power during periods of inactivity.

Data storage 106 may be coupled to the microcontroller 106 through the data switch 102. In one embodiment the data storage 106 is a flash memory device that may have up to 2

Giga bits (Gb) of memory. In an embodiment, a large amount of data storage 106 is provided in order to ensure that there is no loss of data while the sensing device 100 is mobile, during communication network outages or while a power source is interrupted, for example, while changing a battery.

The data storage 106 may be Flash memory, Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM), Non-Volatile Random Access Memory (NVRAM), Magnetic Random Access Memory (MRAM) or any other type of memory.

In another embodiment, the data storage 104 may be a disk drive, Digital Video Disk (DVD) drive, Compact Disk (CD) drive, Redundant Array of Independent Disks (RAID), tape drive or other storage device. In this embodiment, a disk controller may be included in the microcontroller 106 or coupled to the microcontroller 106 in the sensing device 100 to control access to the data storage 106 through the data switch 102.

The docking station 110 is typically used as an external power supply source for the device 100 and allows a battery included in the device 100 to be charged. In order to determine if the device 100 is coupled to the docking station 110, the data switch 102 may monitor a state of an external connector 116. The data switch 102 may detect that the connector 116 is activated based on a state of a signal, for example, host bus power 118 received from a docking station 110. The host bus signal 118 may be asserted based on the presence of external or bus power provided by a docking station 110 or a computing device integrating components of a docking station.

A docking station 110 may also provide additional functionality for a portable device 110 for functions that may be removed from the portable device 100 in order to increase portability. The additional functionality may include a display connector and one or more Universal Serial Bus (USB) ports. In the embodiment shown, the docking station 110 includes a host communication port 112 and a host storage controller 114. In an embodiment, the host communications port 112 may communicate with a host system (not shown) over a serial communications network using serial network communications protocols such as Universal Serial Bus (USB), Institute of Electrical and Electronics Engineers (IEEE) 1394 or any other type of serial network communications protocol.

The dock detector 108 may monitor the state of the host bus power signal 118 received through external connector 116 to determine whether the portable device 110 is coupled to a docking station 110. The state of a docked signal 120 that is output by the dock detector 108 provides an indication as to whether the portable device 100 is coupled to the docking station 110.

The docked signal 120 that is output from dock detector 108 is coupled to the data switch 102. Based on the state of the docked signal 120, the data switch 102 gives exclusive access to the data storage 104 to either the microcontroller 106 through bus 122 and bus 124 or the docking station 110 through bus 126 and bus 124. Upon detection of activation of the external connector 116 through the docked signal 120, the data switch 102 may disable access to the data storage 104 by the microcontroller 106 and enable access to the data storage 104 via a host communication port (a high-speed peripheral Input/Output (I/O) interface) 112 that is included in the docking station 110.

Based on the state of the docked signal 120, while the portable device 100 is not coupled to the docking station 110, the data switch 102 gives exclusive access to the data storage 104 to the microcontroller 106. While the portable device 100 is not coupled to the docking station 110, all accesses to the data storage 104 from the host storage controller 114 in the docking station 110 are disabled by the data switch 102. Thus, data transfer is enabled only to/from data bus 122 from/to data bus 124 through the data bus switch 102.

While the portable device 100 is coupled to the docking station 110 and power is applied to the docking station, the state of the docked signal 120 that is coupled to the data switch 102 indicates that the portable device 100 is coupled to the docking station 110. Based on the state of the docked signal 120 while the portable device 100 is coupled to the docking station, the data switch 102 gives exclusive access to the data storage 104 to the host storage controller 114. Accesses to the data storage 104 from the microcontroller 106 in the device 100 are disabled by the data switch 102. Thus, data transfer is enabled only to/from data bus 122 from/to data bus 126 through the data bus switch 102.

In an embodiment of the present invention, active detection of the host dock connection through the docked signal 120 is used to take advantage of a host system capability to transfer data over a high-speed wired communication network. When the portable device 100 is initially docked, that is, the host storage controller 114 is coupled to the data switch 102, the docked signal 120 is asserted (set to logical '1') and breaks a connection in the data switch 102 between the data storage 104 and the microcontroller 106. While asserted, the docked signal 120 allows a connection to be formed in the data switch 102 between the microcontroller 102 and the high-speed storage controller 114.

In one embodiment, the host storage controller 114 is included in the docking station 110. In another embodiment, a high speed host storage controller 114 may be included in the device 100. However, in order to save power, in an embodiment in which the high speed storage controller 114 is included in the portable device 100, power is only applied to the high speed storage controller 114 while the portable device 100 is connected to the docking station 110 or is directly connected to a host system. In this embodiment, sensor data stored in data storage is passed directly through the data switch 102 instead of passing through the microcontroller 106.

During a transfer of data to/from the host system from/to the portable device 100 through the host communications port 112, the microcontroller 106 in the portable device 100 may gracefully interrupt its normal processing activities. However, the portable device 100 may continue to perform sensing activities during the transfer to/from the host system through the docking station 110 by storing sensed data in memory in the microcontroller 106. After the device 100 is disconnected from the docking station 110, operation of the portable device 100 may resume or restart.

As the microcontroller 106 operates at a low frequency in order to conserve power consumption, the rate at which the microcontroller 106 accesses the data storage 104 is slow. However, the rate at which the host storage controller 114 in the docking station 110 accesses the data storage 104 is not limited by the low frequency microcontroller 106. Thus, data stored in the data storage 104 may be downloaded to the host system by the data storage controller 114 at a rate that is much faster than the rate at which data is stored in the data storage 104 by the microcontroller 106. Similarly, data may be uploaded to the data storage 104 by the data storage controller 114 at a faster rate.

By allowing the data stored in the data storage 104 to be transferred to the host system by the host storage controller 114 instead of by the microcontroller 106, the data transfer time for downloading acquired (sensed) data stored in the data storage 104 in the portable device 100 to a host system is greatly reduced. A data transfer to/from data storage 104 may occur automatically upon detecting presence of the data storage 104 by the host storage controller 114 in the docking station 110 For example, in an embodiment in which data and commands are transferred between the docking station 110 and the data storage 104 using Secure Digital Input/Output (SDIO), presence of the data storage 104 may be detected by the docking station 110 through connection 116 as described in Secure Digital Input/Output (SDIO) specification, Version 1.0, October 2001.

In a medical sensor embodiment, the portable device 100 also allows plug-and-play access to stored acquired medical sensor data using existing USB mass storage device classes. For example, USB mass storage device classes include magnetic hard drives, compact disks (CD), digital video disks (DVD), flash memory cards and flash memory devices. Furthermore, the direct access to the data stored in data storage 104 by the host system provides guaranteed access to stored sensor data from a host system even if the sensor microcontroller is not otherwise operational. For example, the microcontroller 106 in the portable device 100 may be inoperable due to a firmware bug (error) or a discharged battery.

In addition, the ability to allow a host system to directly control the download of stored sensor data from a sensing device minimizes cost, size, and complexity of sensing device by eliminating the need for a user interface or controls. Also, the system partitioning provides advantages when pursuing or testing for US Food and Drug Administration (FDA) or regulatory approval for a medical sensing device by removing download functionality to an external device (host system).

If the sensor data stored in the data storage is in a proprietary binary or encrypted format, the host system can perform a low-level copy, reformat, or decode the data using known methods providing interoperability without performing any modifications to firmware in the device.

If the sensing device 100 fails due to inability of sensor firmware to execute, for example, due to reduced power (voltage, current levels) because of the discharge of the battery in the device, the path to data storage 104 through the host storage controller 114 allows access to stored data and recovery of data until the point of failure. The ability to access this data is important in an embodiment in which the device is a disposable one-time use sensor tag with an encapsulated conventional battery.

The dual mode interconnection to data storage 104 provided by the data switch 102 may be used in devices for medical monitoring and personal data monitoring and analysis and in portable multi-media devices.

Figure 2:
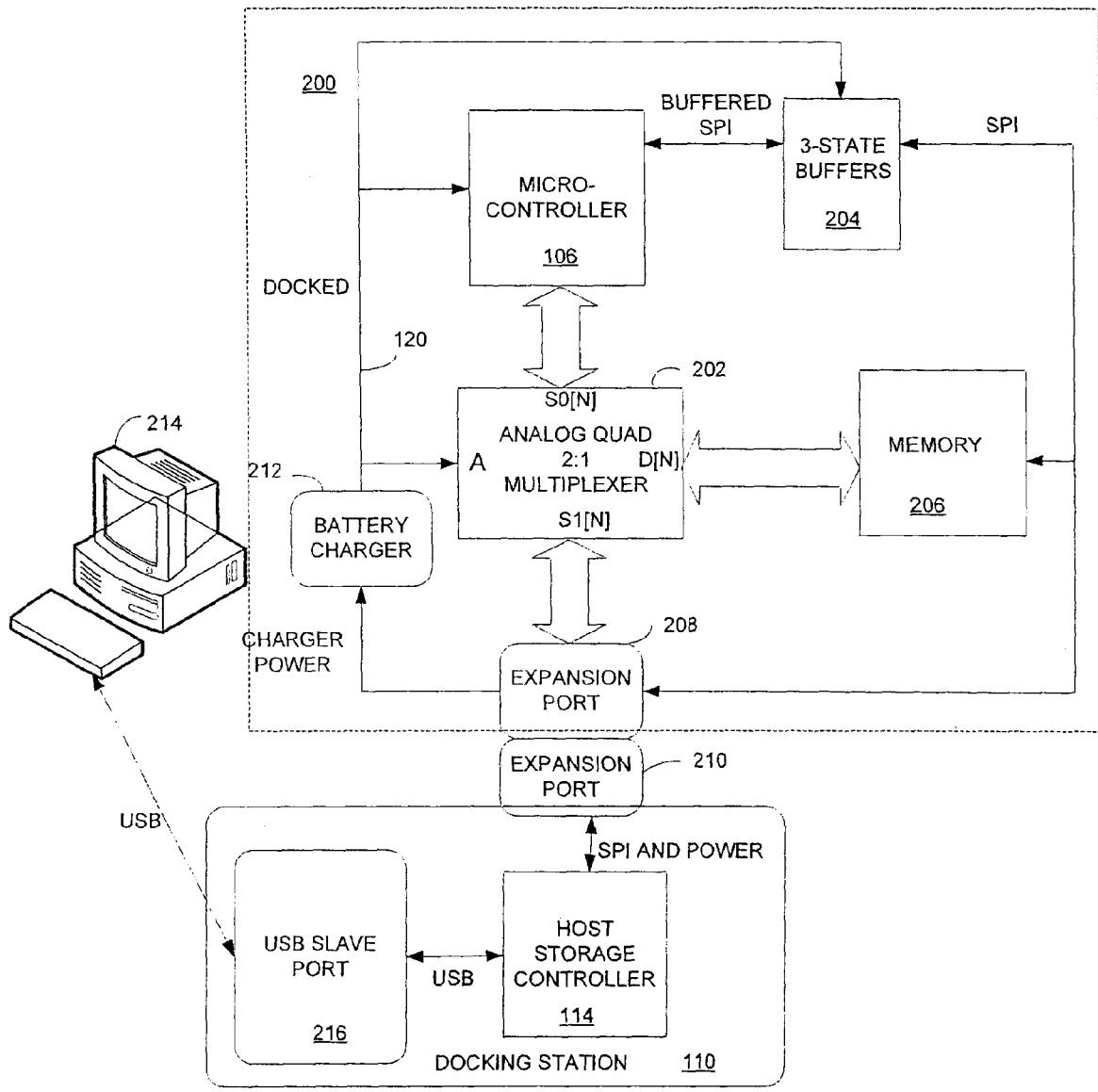
FIG. 2 is a block diagram of an embodiment of the device shown in FIG. 1 for a wearable sensor to be coupled to a docking station.

FIG. 2 is a block diagram of an embodiment of the portable device 100 shown in FIG. 1 for a wearable sensor 200 to be coupled to a docking station 110. The wearable sensor 200 includes a data switch that includes a Bi-directional analog quad 2:1 multiplexer 202 and 3-state logic buffers 204. In one embodiment the data switch uses less than 10 micro Amps (μA) of the power overhead of the wearable sensor 200.

In an embodiment the memory 206 is a Flash memory, for example, MicroSD™ that implements a 1-bit Serial Peripheral Interface (SPI) mode with the SPI bus protocol used to communicate between the microcontroller 106 and the memory 206. In other embodiments, the memory 206 may be Compact Flash (CF) or Memory stick (a removable Flash memory card) or SmartMedia (also referred to as a Solid State Floppy Disk Card (SSFDC)) formats.

In an embodiment, when the wearable sensor 200 is coupled to the docking station 110 through expansion ports 208, 210, the docked signal 120 is asserted (set to logical '1') by a battery charger 212 upon detecting charger power delivered from the docking station 110 through the expansion ports 208, 210. The charger power is delivered while the docking station 100 is coupled to bus power or to a host, for example through a USB Slave port 216. The USB Slave port 216 may communicate with the host via a wired or wireless connection. In other embodiments, other dock detection mechanisms may be used such as a request/grant signal exchange or reading a digital Identifier stored in a non-volatile memory for example, Electrically Erasable, Programmable, Read Only Memory (EEPROM).

The state of docked signal 120 controls the path through the bi-directional 2:1 analog multiplexer 202 and also controls disabling/enabling of the 3-state buffers 204. The bi-directional 2:1 analog multiplexer 202 is used to multiplex both bi-directional logic (digital) signals and analog signals. In an embodiment, the signals are defined by the SDIO specification based on one of a plurality of modes, for example, SD-mode (1 bit or 4-bit) and SPI-mode. FIG. 2 illustrates signals used when operating in SPI mode. For example, in SD-mode, the bi-directional logic signals may include SD data signals (SD_DATA[3:0]) and in SPI-mode the bi-directional logic signals may include Chip Select/Slave Select (SS), Master In Slave Out (MISO) and Interrupt Request (IRQ).

The bi-directional 2:1 analog multiplexer allows bi-directional interconnection, but because it lacks the signal integrity benefits of buffering, in the embodiment shown, 3-state buffers 204 are used for unidirectional signals such as Clock and Command in SD-mode and signals such as the clock signal (SCK), the unidirectional Master In Slave out (MISO) signal from memory 206 to the microcontroller 106 or the Master Out/Slave In (MOSI) unidirectional signal to memory 206 from the microcontroller 106 in SPI mode. In an alternate embodiment, a bi-directional buffer may be used instead of the bi-directional 2:1 analog multiplexer 202. While the wearable sensor 200 is not coupled to the docking station 110, bi-directional signals to/from the microcontroller 106 to/from memory 206 are enabled through the bi-directional 2:1 analog multiplexer 202.

While the wearable sensor 200 is coupled to the docking station 110, the state of the docked signal 120 that is output from the battery charger 212 enables a path through the bi-directional 2:1 analog multiplexer 202 from the DO bi-directional I/O to the SO bidirectional I/O allowing data to be transferred directly from the host system 214 through the docking station 110 to the memory 206.

Thus, data transfer between the host system 214 and the memory 206 in the wearable sensor 200 may be transferred at the data transfer rate supported by the host storage controller 114 in the docking station 110 and the data transfer rate supported by the host system 214. While data transfer is taking place between the host system 214 and the memory 206 in the wearable sensor 200, data transfer through the 3-state buffers 204 and the bi-directional 2:1 analog multiplexer 202 between the microcontroller 106 and the memory 206 is disabled. However, the high-speed transfer at the rate supported by the host storage controller 114 through the docking station 110 minimizes the time that the microcontroller 106 is unable to access memory 206. As the acquisition rate of sensor data is much slower than the rate at which stored sensor data is being transferred to the host, there is sufficient memory in the microcontroller 106 for storing sensor data that is acquired during the data transfer to the host system 214. This allows the wearable sensor 200 to continue to acquire sensor data while the stored sensor data is downloaded to the host system 214.

In an embodiment, the host system 214 may use additional features of the I/O interface to enter high-speed transfer mode. For example, SD media has a four-bit SD mode that requires 2 additional data lines. If the host system 214 requires additional data or control lines for high-speed transfer, multiplexing logic may be included to multiplex the data or control lines on device I/O pins that are not required during data transfer operations.

In one embodiment, the dual-mode system interconnection may be used in a medical device to download stored sensed data such as electrocardiogram (ECG), kinematics (that is, aspects of motion including acceleration, tilt, rotation and orientation), electromyogram (EMG), galvanic skin response (GSR), electroencephalogram (EEG) data, accelerometer data or gyro data.

Figure 3:
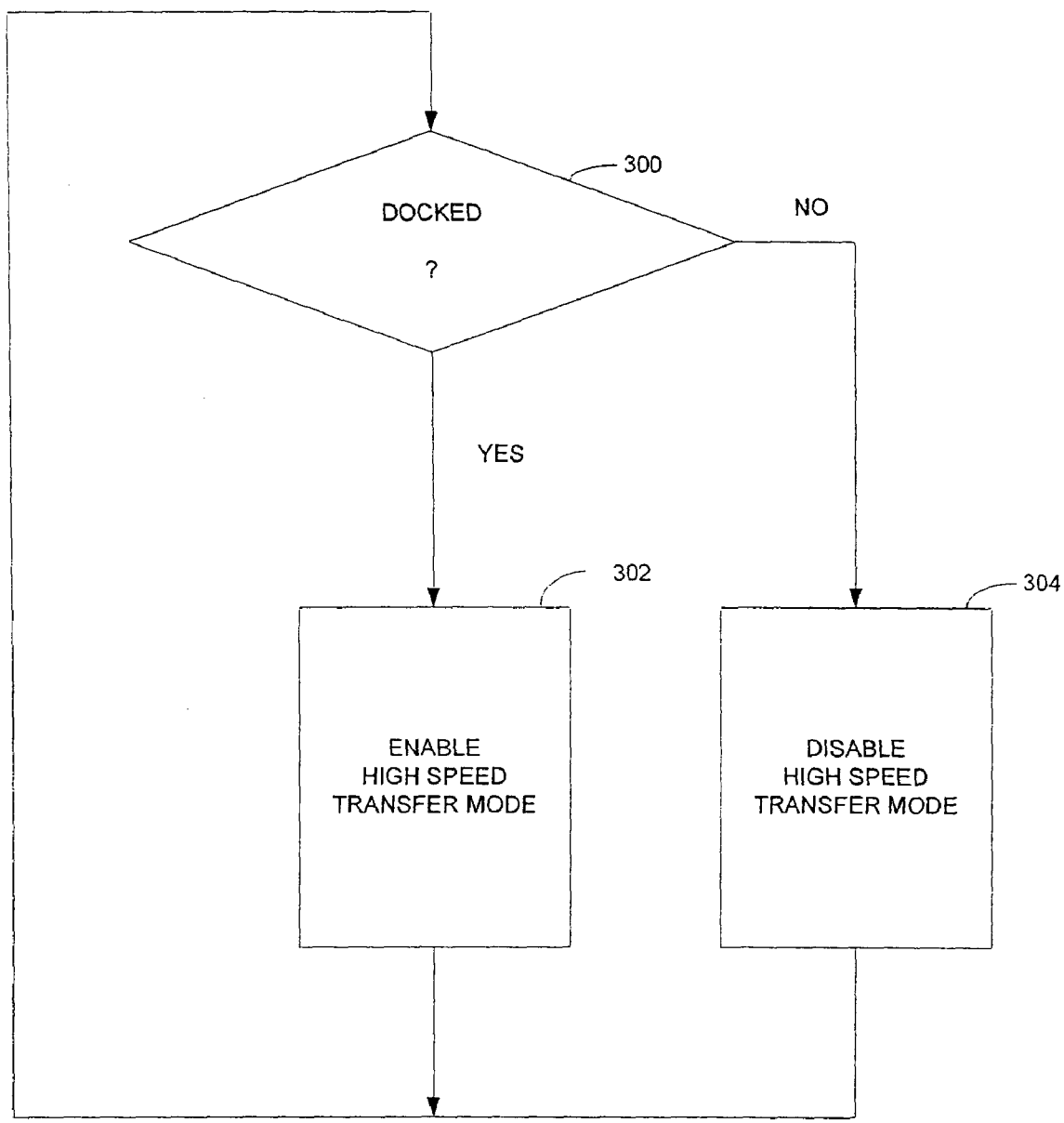
FIG. 3 is a flowgraph illustrating an embodiment of a method to allow a host system to control transfer of data stored in a low power small form factor portable device.

FIG. 3 is a flowgraph illustrating an embodiment of a method to allow a host system to control transfer of data stored in a low power small form factor portable device. FIG. 3 will be described in conjunction with FIG. 1 and FIG. 2.

At block 300, the data switch 102 receives an indication as to whether the portable device 100 is coupled to a docking station 110. The indication may be provided by a docked signal 120 received by the data switch 120. In another embodiment, the indication may be provided another signal received from the microcontroller 106 indicating whether the portable device 100 is coupled to the docking station 110. If the state of the docked signal 120 indicates that the portable device 100 is coupled to the docking station 110, processing continues with block 302. If not, processing continues with block 304.

At block 302, the portable device 100 is coupled to the docking station 110. Thus, high-speed transfer is enabled through the docking station 110. The docked signal 120 enables a data path through the bidirectional 2:1 analog multiplexer 202 from the n-bit DO bi-directional I/O to the n-bit S0 bi-directional I/O allowing data to be transferred directly from the host system 214 through the docking station 110 and expansion ports 208, 210 to flash memory 206. The docked signal 120 disables the data path from the microcontroller 106 to the flash memory 206 through 3-state buffers 204 and to the docking station 110 through the bidirectional 2:1 analog multiplexer 202. Processing continues with block 300 to continue to check the state of the docked signal 102.

At block 304, the portable device 100 is coupled to the docking station. The docked signal 120 enables the data path between the microcontroller 106 and the flash memory 206 through 3-state buffers 204. Processing continues with block 300 to continue to check the state of the docked signal 102.

In other embodiments, the dual-mode system interconnection may be included in a consumer device, for example, a multi-media device to download multi-media content such as video to the device or to upload video, audio or images captured by the consumer device. The dual-mode system interconnection may also be used in a motion capture device that may include tilt sensors, gyroscopes, or accelerometers.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a processor;
   a memory accessible by the processor; and
   a logic interface coupled between the processor and the memory, the logic interface to enable access to the memory via a high-speed peripheral Input/Output (I/O) interface upon receiving an indication that a state of an external connector has transitioned from a non-active state to an active state, the indication that the state of the connector is active is based on a state of a signal received from a docking station, the high-speed peripheral I/O interface is located in the docking station, the processor to operate at a low frequency and the logic interface to allow an external host to control transfer of data directly to/from the memory via the high speed peripheral I/O interface at a faster rate than the rate at which data is stored in memory by the processor and to enable exclusive access to the memory by either the processor or the external host via the high-speed peripheral I/O interface.

2. The apparatus of claim 1, wherein the signal is asserted based on the presence of external or bus power from a docking station or computing device integrating components of a docking station.

3. The apparatus of claim 1, wherein data is transferred between a host and the high-speed peripheral I/O interface over a wireless connection.

4. The apparatus of claim 1, wherein the memory stores sensed biometric parameter data acquired by the processor.

5. The apparatus of claim 4, wherein the sensed biometric parameter data is electrocardiogram (ECG), kinematics, electromyogram (EMG), galvanic skin response (GSR), electroencephalogram (EEG), accelerometer or gyro data.

6. The apparatus of claim 1, wherein the activation of the external connector is automatically sensed by a docking station.

7. A method comprising:
   providing a first path to a memory accessible by a processor;
   providing a second path to a memory via a high-speed peripheral Input/Output (I/O) interface port for transferring data between the memory and a host system;
   monitoring a state of an external connector; and
      upon detecting activation of the external connector, enabling access to the memory via the second path, the detection of activation of the external connector is based on a state of a signal received from a docking station, the high speed peripheral I/O interface is located in the docking station, the processor to operate at a low frequency and the logic interface to allow an external host to control transfer of data directly to/from the memory via the high speed peripheral I/O interface at a faster rate than the rate at which data is stored in memory by the processor and to enable exclusive access to the memory by either the processor or the external host via the high-speed peripheral I/O interface.

8. The method of claim 7, wherein the signal is asserted based on the presence of external or bus power from a docking station or computing device integrating components of a docking station.

9. The method of claim 7, wherein data is transferred between a host and the high-speed peripheral I/O interface over a wireless connection.

10. The method of claim 7, wherein the memory stores sensor biometric parameter data acquired by the processor.

11. The method of claim 10, wherein the sensed biometric parameter data is electrocardiogram (ECG), kinematics, electromyogram (EMG), galvanic skin response (GSR) electroencephalogram (EEG), accelerometer or gyro data.

12. The method of claim 7, wherein the external connector is automatically sensed by a docking station.

13. A system comprising:
a docking station; and
a portable device comprising:
    a processor;
    a memory accessible by the processor; and a logic interface coupled between the processor and the memory, the logic interface to enable access to the memory via a high-speed peripheral Input/Output (I/O) interface upon receiving an indication that a state of an external connector has transitioned from a non-active state to an active state, the indication that the state of the connector is active is based on a state of a signal received from the docking station, the high-speed peripheral I/O interface is located in the docking station, the processor to operate at a low frequency and the logic interface to allow an external host to control transfer of data directly to/from the memory via the high speed peripheral I/O interface at a faster rate than the rate at which data is stored in memory by the processor and to enable exclusive access to the memory by either the processor or the external host via the high-speed peripheral I/O interface.

14. The system of claim 13, wherein the memory stores sensed biometric parameter data acquired by the processor.

15. The system of claim 14, wherein the sensed biometric parameter data is electrocardiogram (ECG), kinematics, electromyogram (EMG), galvanic skin response (GSR) electroencephalogram (EEG)), accelerometer or gyro data.

16. The system of claim 13, wherein the activation of the external connector is automatically sensed by a docking station.

* * * * *